United States Patent [19]

Rooney

[11] 4,282,102
[45] Aug. 4, 1981

[54] ACTIVATED SLUDGE WASTEWATER TREATMENT HAVING SUSPENDED INERT MEDIA FOR BIOTA GROWTH

[75] Inventor: Thomas C. Rooney, Waukesha, Wis.

[73] Assignee: Rexnord Inc., Milwaukee, Wis.

[21] Appl. No.: 98,693

[22] Filed: Nov. 29, 1979

Related U.S. Application Data

[63] Continuation of Ser. No. 940,923, Sep. 11, 1978, abandoned.

[51] Int. Cl.³ .............................................. C02F 3/08
[52] U.S. Cl. .................................. 210/616; 210/629; 210/926
[58] Field of Search .................. 210/14, 17, 616, 619, 210/629, 926

[56] References Cited

U.S. PATENT DOCUMENTS

| | | | |
|---|---|---|---|
| 2,071,591 | 2/1937 | Tholin | 210/17 |
| 3,757,950 | 9/1973 | Zebley | 210/14 X |
| 4,055,490 | 10/1977 | Hasegawa et al. | 210/17 |
| 4,184,946 | 1/1980 | Kato | 210/14 |

Primary Examiner—Thomas G. Wyse
Attorney, Agent, or Firm—Aaron L. Hardt; Vance A. Smith

[57] ABSTRACT

In the activated sludge process for treating wastewater loss of biologically active microorganisms from the aeration-mixing tank to the clarifier is reduced and the biological process whereby wastewater is treated is made more efficient by the addition of inert solid particulate matter to the liquid while in the aeration tank to provide mobile sites upon which the organisms will attach and grow.

3 Claims, 2 Drawing Figures

ACTIVATED SLUDGE WASTEWATER TREATMENT HAVING SUSPENDED INERT MEDIA FOR BIOTA GROWTH

This is a continuation of application Ser. No. 940,923, filed Sept. 11, 1978, now abandoned.

BACKGROUND OF THE INVENTION

1. Field of the Invention

This invention relates to an improvement in the method of biologically purifying wastewater and more particular to an improved method for the activated sludge wastewater treatment process.

2. Description of the Prior Art

The activated-sludge process is a wastewater treatment process by which biologically active microorganisms are continually circulated with incoming biologically degradable waste in the presence of oxygen so that the organic material in the sewage is decomposed to an acceptable degree by the action of the natural life processes of bacteria and other microorganisms. This process is characterized by the presence of countless living organisms as active agents of purification, which, living in the aerobic conditions that are carefully maintained, feed upon the impurities in the wastewater and convert these dissolved impurities into additional cellular masses of microorganisms that are readily removable by sedimentation, the product of which is known as activated sludge.

Wastewater treatment plants employing this process consist essentially of a system having a primary aeration chamber or reactor that may be either a tank or, in the case of a variation known as the oxidation ditch, an open channel, into which sewage flows and where mixing and aeration occur. After a detention period in the aeration chamber, the duration of which depends upon the system design characteristics, the reactor effluent goes to a clarifier tank where in a quiescent environment solids suspended in the liquid settle at the bottom of the clarifier. These solids are then taken in the form of the concentrated sludge that collects at the bottom of the clarifier and are readmitted to the primary aeration tank into which untreated wastewater continually is supplied. Supernatant liquids are drawn from the clarifier and the plant as treated wastewater.

An activated-sludge process can be visualized as a fluid bed process in which the microorganisms are distributed and circulated throughout the wastewater while in the reactor, as distinguished from a second class of treatment process known as the trickling filter process. In the former, contact between the biological organisms and the dissolved organic matter in the wastewater is random and dispersed and preferably occurs throughout all regions of the reactor. The microorganisms are continually held in suspension because the wastewater is constantly being agitated by aeration techniques in the reactor either using waterfall methods, whereby water is tossed into and permitted to fall through the air or by injecting air, as by bubbling through the wastewater. Instead, the trickling filter provides fixed surfaces in the form of a bed of crushed stone or gravel upon which the organisms attach and react with the wastewater-organic material as the sewage trickles downwardly through the bed to drains that carry the effluent away.

In the activated sludge process the circulating mixture is aerated wastewater containing dissolved organic waste material, the microorganisms feeding upon the organics and the activated sludge drawn from a clarifier tank is retained in the reactor for a period of time that varies with the requirements of the particular system and according to the requirements of certain parametric modifications of the process. The majority of extended aeration plants provide long-term, complete-mixing activated sludge systems that maintain the microorganisms in the endogenous phase by establishing a low food-to-microorganism ratio in the mixed reactor liquor. Efficiency of the treatment process is, among other variables, a function of the concentration of active biomass in the system, particularly the concentration in the reactor. Periodic escape of biota from the reactor with the concomitant reduction in overall process efficiency have frequently been noted. To maintain the biologically-active organisms within the reactor, clarifier sediment is continually returned to the reactor rather than allowing the microorganisms to exit the system with the clarifier effluent.

A clarifier tank is essentially a settling chamber into which reactor effluent flows following its reactor detention period. A clarifier is reqired because conventionally clarifier influent contains microorganisms in approximately the same concentrations as they exist in the reactor. But it is advantageous for purposes of maintaining a large concentration of microorganisms in the reactor to recover them, in this case by sedimentation at the bottom of a clarifier, and to return them in a substantially more concentrated liquor to the reactor where they can again interact with the wastewater organics. Loss of the biological organisms from the system represents loss of the vital medium that is fundamental to the activated sludge process.

Typically a clarifier has a cylindrical tank portion positioned above a conically-shaped lower portion. Reactor effluent flows into the tank where in a quiescent environment the heavier masses of microorganisms settle and concentrate in the conical portion in a form known as activated sludge. Suitable piping carries the clarifier precipitate back to the reactor where it is introduced to and mixed with the circulating wastewater usually at a point upstream of the aerator and downstream of the location from which reactor wastewater is taken off for delivery to the clarifier. The treated wastewater remaining in the clarifier above the precipitate is taken off and discharged from the plant.

Conventional activated sludge treatment systems must provide a clarifier of a sufficient size to allow for the volume of clarifier effluent to equal the volume of plant influent over that period of time that is required for an acceptable degree of sedimentation to occur. Moreover, under system load conditions that produce extreme turbidity of the reactor effluent, its clarifier detention period must be increased above the normal duration period to produce a plant effluent that is acceptable in regard to clarity, which condition demands a clarifier of even greater size than normal operation would require. In present practice with systems having a more or less uniform concentration of suspended solid matter in the reactor-based fluid and in the reactor effluent, the piping and pump capacities must necessarily be increased above their capacity requirements if suspended solids were to remain in the reactor and the system were to produce an equivalent volume of treated wastewater. Less power to pump a lesser volume of activated sludge would be required, yet the volume of treated wastewater produced will be maintained with plants employing this invention.

SUMMARY OF THE INVENTION

Accordingly, among the objects of the present invention are to provide an activated sludge wastewater system: capable of maintaining the purifying agency of the microorganisms in mobile suspension while in the aeration reactor; which has particulate matter that is mixed with the reactor liquor and provides surfaces upon which wastewater-borne microorganisms can attach and interact with sewage-related organic material; capable of retaining the microorganisms in the reactor rather than supplying the clarifier from the reactor with a fluid having microorganism concentrations that are nearly equivalent the reactor fluid concentrations; whose clarifier tank capacity, associated piping and pumping apparatus may be of a size less than would be required in systems of this type wherein the reactor effluent has microorganism concentrations approximately equivalent to such concentrations existing in the reactor liquor; and requiring less power to pump reactor effluent to the clarifier and less power to pump clarifier sludge back to the reactor than previously known systems of this type.

In accomplishing these and other objects, the improved wastewater treatment system of the present invention generally includes the addition of fine, inert sized particulate matter such as sand to the reactor liquid either before the liquid is first introduced to the aeration reactor or while it is in the reactor, means for so aeration, mixing and causing flow of the aerating reactor fluid that the fine particulate is held in suspension in the reactor, and provision for removing fluid from the reactor for delivery to a clarifier so that the particulate and the attached microorganisms are retained in the reactor.

DESCRIPTION OF THE PREFERRED EMBODIMENT

Figure 1:
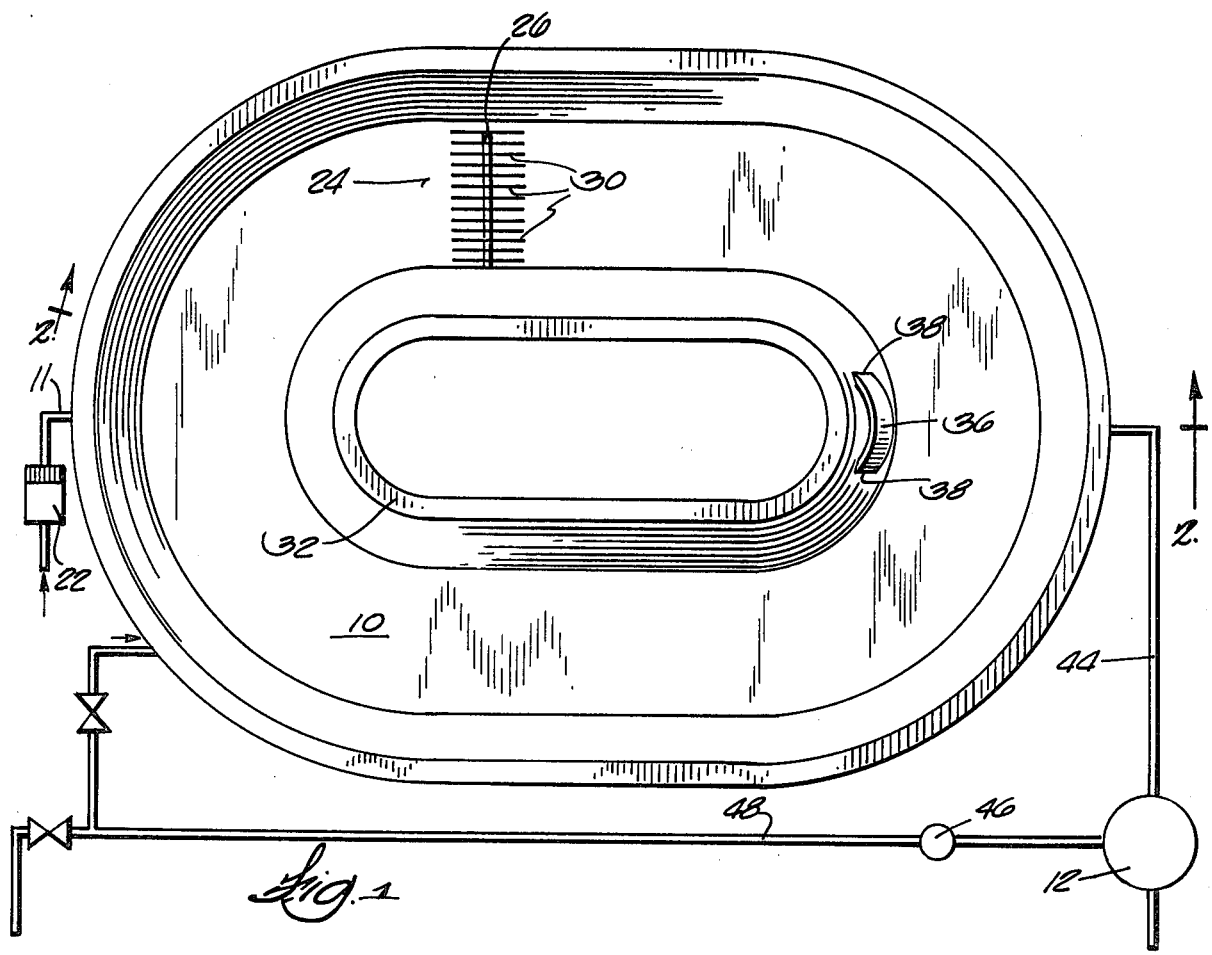
FIG. 1 is a general arrangement view of an activated sludge wastewater treatment system of the oxidation ditch type.

FIG. 1 illustrates an oxidation ditch application of the activated sludge process. In its simplest form any activated sludge wastewater treatment process consists of an aeration tank or reactor 10 into which sewage is admitted at inlet port 11 and held for a period during which time it is mixed, aerated and withdrawn; a settling tank or clarifier 12 into which the aeration tank effluent flows; and means 48 for returning the clarifier sludge to the aeration tank. Fundamentally, the activated sludge process continually circulates biologically active organisms or biota with incoming biologically degradable waste carried in the wastewater in the presence of oxygen. After a period of time in the aerator tank, a large mass of floc or settleable solids may form, this floc being composed of the masses of the biota that have agglomerated but which biota are otherwise uniformly distributed throughout the aeration tank mixture.

Although FIG. 1 schematically presents the process as embodied by one variation called the oxidation ditch, the present invention is as well applied to other variations of the activated sludge process wherein, for example, the aeration tank is merely a cylindrical tank having mixing and aeration capacity. There will be, of course, alternative methods employed to aerate the mixture where tanks are used; mechanical surface aerators such as spray nozzles, which continually discharge the mixture into the air after which the water falls back into the tank carrying with it entrained air bubbles, are commonly applied. Air bubbling devices, spargers, diffusers and slotted pipes are a few additional methods for producing aeration in tank-type aeration equipment. An oxidation ditch, on the other hand, is more efficiently aerated with a cage or disk rotor.

According to the present invention, solid particulate 16 that is substantially chemically and biologically inert is added to the wastewater preferably after it has entered the reactor and the concentration of microorganisms per unit volume of reactor liquor has been determined, as is normally done in units of milligrams of biomass per liter of reactor fluid. Suitable particulate materials include sand, quartz, gravel, glass, coal, plastic, alumina, chromite, magnesia, zirconia, titania and others naturally existing and manufactured, provided they are non-toxic to the microorganisms and of a proper size and specific gravity. It is known that biota will attach and grow on the surfaces of material with which it comes in contact, in this case the outer surface of the particulate that is held in suspension and circulates with the reactor wastewater. Should the individual particles of the carrier material be heavier than the weight capable of being held in suspension by the moving stream of reactor-based wastewater, the particulate will settle at the bottom of the reactor and the desired contact with wastewater-borne biota will be substantially reduced. At the other extreme, should the weight of the individual carrier particles be too light such that when the attached biota growth approaches its maximum film thickness the effective specific gravity of the composite carrier nucleus and biota shell approaches one, the biota tend to be swept out of the reactor at the exit port and delivered to the clarifier. A further consideration is provision of enough particulate surface area to accommodate a substantial portion of the biomass population that exists in the reactor.

It has been determined that the material of the particulate should have a specific gravity not less than 2.0 and preferably greater than 2.5 but less than 5.5. The preferred particulate size to effectively provide sufficient surface area and a mass capable of being held in suspension yet not readily carried out of the reactor through the exit port is in the range of 0.30 to 1.2 millimeters diameter, or, as is usually the case where irregularly shaped particles are used, the mean effective diameter should compare to this standard. Furthermore, a preferred volume of particulate in the range of 0.5 to 2.0 liters of particulate per kilogram of biota in the reactor fluid has been determined to effectively provide sufficient surface area for the microorganisms to attach and minimizes the tendency for biota to exit the reactor in concentrations nearly equivalent reactor concentrations of biota.

Figure 2:
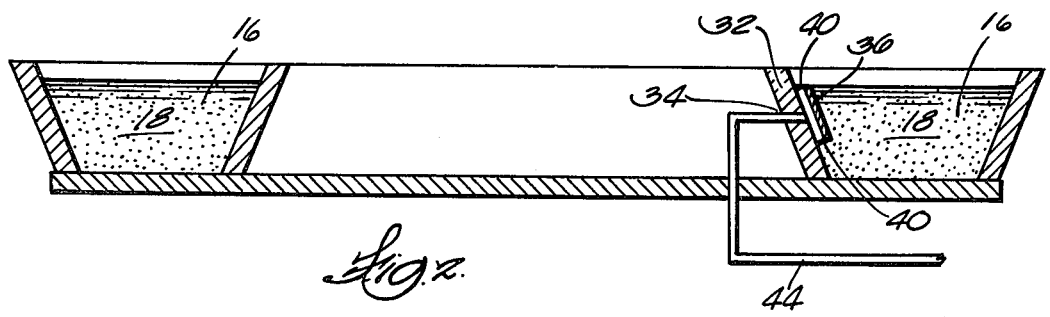
FIG. 2 is a side elevation section of the oxidation ditch through the longitudinal axis 2—2 of FIG. 1.

The most commonly used oxidation ditch 10 configuration for municipal sewage treatment has a trapezoidal cross-section 18, as shown in FIG. 2, and forms a continuous circuit, generally as elongated oval. The ditch 20 serves as an aeration reactor and the circuit provides a complete mix basin wherein long-term aeration occurs. Raw sewage or influent having first undergone a primary treatment process passes directly through a bar screen 22 into the reactor 10. Cage rotors 24 spaced along the circuit aerate the fluid to support the oxygen needs of the biota population and produce forces by way of a turbine effect, which act upon that portion of the reactor fluid at the upper surface with which the rotor reacts, which forces produce flow in the ditch. Fluid velocities averaging in the range of one to three feet per second are established throughout the reactor 10 by the rotors 24 that are positioned along the circuit in numbers sufficient to provide the requisite propulsion, mixing and aeration action. A typical rotor rotates on a shaft 26 whose axis is parallel to the liquid surface and aligned normal to the direction of flow. Usually a rotor consists of teeth mounted on the periphery of spaced circular disks 30 that are distributed across the width of the ditch and coaxial with the shaft axis. The shaft is held above the liquid surface at such a distance that the disks extend into the wastewater at the lower diametral extremity and rotate through the air at the diametrically opposite end.

The randomly moving particulate will begin to have a slimy film of microorganisms attach, which will grow in size and weight as time passes. This addition will affect the specific gravity and effective diameter of the composite particle held in suspension and the magnitude of the critical velocity required to maintain suspension. For purposes of determining critical velocity the average value of specific gravity and diameter may be calculated by weighting the averages according to the respective volumes of solid particulate and biomass and by assigning a specific gravity to the biomass of 1.1.

Reactor liquor is continually withdrawn from the ditch at exit port 34 and supplied to a clarifier tank 12 in which the settleable, agglomerated and dispersed masses of biota are separated as precipitate from liquid. In drawing off the reactor fluid a port 34 is provided through the wall 32 of the reactor 10, preferably through the interior wall at a turn in the circuit. Centrifugal force acting on the suspended particles, most of which have biota attached, tends to produce a concentration of particles at the outer periphery of the reactor turns and a substantially reduced density at the inner radius. For this reason the exit port 34 is better located on the inner wall 32 of the reactor to further retard the ability of particulate and agglomerated microorganisms to exit the reactor with the effluent. The port 34 is covered with a baffle 36 or other means that minimize exit fluid velocities or require flow reversals from the predominant ditch stream direction into the port. The baffle 36 is of sheet metal or other structural material such as fiberglass that provides an erosion and corrosion resistant surface. The baffle disposed over the exit port and extending beyond the port aperture in all directions is sealed against flow around the vertical edges of its periphery 38 but is open at its upper and lower ends 40. The space 42 between the ditch wall and the interior surface of the baffle provides a conduit for fluid that flows over and under the horizontal edges toward the port.

Reactor effluent is carried by piping 44 to a clarifier tank 12 wherein fluid velocities are substantially nonexistent and held there for a suitable period during which the biota that escaped the reactor settle to the clarifier tank bottom. This material, known as activated sludge, is drained from the tank to a pump 46 and is delivered back through piping 48 to the reactor 10. Sludge reenters the reactor ditch usually immediately upstream of the rotor but sufficiently far downstream of the main influent port 11 so that no short-circuiting occurs. Clarifiers of activated sludge systems incorporating the present invention will require less volume capacity than previous systems because a lesser proportion of settleable solids will exit the reactor. Consequently, shorter periods of detention in the clarifier are required to recover biota by sedimentation and, since clarifiers are designed to accommodate volumes equal to plant influent over the period of clarifier detention, the requisite volume is correspondingly reduced. Likewise, the piping and pump capacities provided to carry reactor liquor to the clarifier and to deliver activated sludge to the reactor will be less than previously required.

In operation the improved activated sludge system of the instant invention will provide, by way of the suspended particulate, mobile bodies having surfaces onto which the bacteria will attach, grow, function and eventually die. Bacterial growth will concentrate at the suspended particles growing in size around the immediate particle surface and in successive layers thereupon until the innermost layers die as a result of being denied adequate sources of oxygen and organic matter. As the process whereby the generations of microorganisms that are centrally located on the particle die, eventually a sloughing off action of the outer bacteria occurs, which action is enhanced by the turbulent condition of the reactor fluid. The host particle and its bacterial population being separated are free to disperse and recombine in an ongoing recurrence of this process. Due to the concentrations of particulate that are maintained in a reactor having a healthy population of microorganisms, each free particle begins, within a brief period following the shedding of its envelope of bacteria, to support and carry a new growth of microorganisms. A film depth on each grain of particulate will grow in size to approximately 200 microns of which thickness the outermost 70 microns will be composed of an active, healthy population of biota and the innermost will be oxygen-denied biota in a somewhat lesser state of health.

The velocity of the reactor liquid is an important factor toward producing the turbulence that is required to adequately mix the fluid and suspend the particulate material and the biological organisms. Mixing aids oxygen transfer to the liquid, retards the formation of bacterial clumps or flocs and produces a homogeneous mixture of the fluid waste, oxygen and bacteria. Fluid velocity in the reactor channel should be maintained equal to or greater than the critical velocity that will keep a solid in suspension in a moving stream as determined by the relationship:

$$V_e = \sqrt{\frac{8B}{f} g (S - 1) d} \quad ,$$

wherein $V_e$ is the critical velocity; B is an experimental constant, approximately 0.04; f is the Weisbach-Darcy friction factor, which approximates 0.03 for most oxidation ditch applications; g is the gravitational acceleration; S is the specific gravity of the solid that is to be held in suspension; and d is the mean effective diameter of the solid particulate held in suspension. Maintenance of the reactor fluid at critical velocities is sufficient to produce turbulent flow in an open channel and the channel velocity is adjusted to produce this value, for example, by varying the rotor speeds or the arrangement of the rotor pumping elements.

I claim:

1. A method of wastewater treatment comprising introducing wastewater containing organic material into an oxidation ditch; adding inert, solid particulate material to said wastewater; continuously circulating said wastewater and particulate material in a substantially horizontal direction within said oxidation ditch by creating a turbulent flow of said wastewater and particulate material, which turbulent flow maintains said particulate material suspended in said wastewater and enables living organisms in said wastewater to attach to and grow on said particulate material; aerating said wastewater and particulate material to promote the growth of said living organisms in said wastewater and on said particulate material; employing centrifugal forces acting on said circulating wastewater and particulate material to produce a concentration of particulate materials at the outer wall of said oxidation ditch; and withdrawing substantially only said wastewater from the interior wall of said ditch, whereby substantially all of said living organisms and particulate materials remain in said reactor.

2. The method of wastewater treatment defined in claim 1, wherein said wastewater and particulate material are circulated and aerated by means mounted on a horizontally mounted rod and continuously rotated in and out of said wastewater and particulate material.

3. The method of wastewater treatment defined in claim 1 or 2, wherein said solid particulate material added to said oxidation ditch has a mean effective diameter ranging from about 0.03 to about 1.2 millimeters, a specific gravity ranging from not less than 2.0 to less than about 5.5, a surface area sufficient to support the population of living organisms existing in said oxidation ditch, and is selected from the group consisting of sand, quartz, alumina, zirconia, chromite, coal, gravel, glass, plastic, titania and magnesia.

* * * * *